United States Patent
Neumann et al.

(10) Patent No.: US 6,175,872 B1
(45) Date of Patent: Jan. 16, 2001

(54) COLLABORATIVE ENVIRONMENT FOR SYNCRONIZING AUDIO FROM REMOTE DEVICES

(75) Inventors: Eric K. Neumann, Rocky River, OH (US); David J. Reider, Cambridge, MA (US)

(73) Assignee: GTE Internetworking Incorporated, Cambridge, MA (US)

( * ) Notice: Under 35 U.S.C. 154(b), the term of this patent shall be extended for 0 days.

(21) Appl. No.: 08/990,122

(22) Filed: Dec. 12, 1997

Related U.S. Application Data
(60) Provisional application No. 60/032,957, filed on Dec. 13, 1996.

(51) Int. Cl.[7] .................................................. G06F 15/16
(52) U.S. Cl. ......................... 709/231; 709/200; 709/217; 709/224; 709/248
(58) Field of Search .................. 395/559; 348/12–15; 707/100–104; 709/200–203, 217–219, 223–224, 231–233, 236–237, 248; 710/30–31, 33; 370/392–398; 463/40–43

(56) References Cited

U.S. PATENT DOCUMENTS

| | | | | |
|---|---|---|---|---|
| 5,127,000 | * | 6/1992 | Henrion | 370/394 |
| 5,388,264 | * | 2/1995 | Tobias, II et al. | 707/103 |
| 5,530,859 | * | 6/1996 | Tobias, II et al. | 713/400 |
| 5,685,775 | * | 11/1997 | Bakoglu et al. | 463/41 |
| 5,721,827 | * | 2/1998 | Logan et al. | 709/217 |
| 5,808,662 | * | 9/1998 | Kinney et al. | 348/15 |
| 5,810,603 | * | 9/1998 | Kato et al. | 709/219 |
| 5,822,543 | * | 10/1998 | Dunn et al. | 709/224 |
| 6,067,566 | * | 5/2000 | Moline | 709/219 |

* cited by examiner

Primary Examiner—Ahmad F. Matar
Assistant Examiner—Bharat Barot
(74) Attorney, Agent, or Firm—Leonard Charles Suchyta; James K. Weixel

(57) ABSTRACT

Apparatus and software systems are disclosed that allow real-time interactive playing of musicians each at remote sites from each other. The remote sites are interconnected over a local communications network or a wide area network like the Internet. The apparatus is connected to music synthesizers that accept streams of MIDI data for playing, or generate streams of MIDI data by playing. The streams of MIDI data are bundled by a MIDI management system into transfer control protocol packets, such that the packets of MIDI data may be transferred over the communications network as or within the transfer control packets. In addition, the networked, remote computer systems are synchronized to a standard clock which is appended to the MIDI data packets, and additionally, the network delay is calculated and also appended to the MIDI data packets. In this manner the local musician can receive the MIDI data packets from the remote sites where musicians are playing and in real-time play with them. The present invention allows other data bases of music to be interrogated and the music therein retrieved for local use, storing and/or editing. The invention allows the received MIDI data from remote sites to be precisely time positioned within the local memory as if on separate tracks like a multi-track tape recorder for later or real-time playing and/or editing.

17 Claims, 5 Drawing Sheets

& 1

COLLABORATIVE ENVIRONMENT FOR SYNCRONIZING AUDIO FROM REMOTE DEVICES

RELATED APPLICATIONS

Priority is claimed under 35 U.S.C. § 119 (e) and § 120 for the present invention from Provisional Application Ser. No. 60/032,957 filed on Dec. 13, 1996 of the same title and inventors as the present application.

FIELD OF INVENTION

This invention relates to the general field of electronic communication of digitized music using the Musical Instrument Digital Interface (MIDI) communication protocol, referred to herein as MIDI data. More particularly, the present invention relates to formatting MIDI data for transfer and use over a local communication network or a wide area communication network, like the Internet.

BACKGROUND OF INVENTION

MIDI data, usually in the form of packets or distinct bundles of a number of bytes, was developed to overcome the large data and fast timing requirements of digitizing the audio music itself and sending that data to a remote site for recreation of the music itself. Instead of digitizing the audio itself, the industry developed MIDI (the protocol) to carry the data necessary to activate sounds, various controllers, and to provide other information. In this way relatively small bundles of MIDI data efficiently carry enough information to represent extensive music files. However, in order to reproduce the music, the MIDI data must be used in conjunction with a sequencer and a synthesizer. Herein a sequencer is defined as a computer and memory arranged to store in parallel a plurality of streaming (substantially continuous) time sequences of MIDI data, and a synthesizer is any device that accepts MIDI data and produces sounds therefrom or accepts inputs from an instrument and produces MIDI data therefrom—the sequencer is, in effect, a computer and memory configured as a multi-track tape recorder. Computer storage of MIDI data has the advantage that the stored data can be edited and/or manipulated as desired.

The use of MIDI data is growing in popularity for the serious musicians, the hobbyist, teachers and students, and for the multi-media. The Internet provides a means for transferring MIDI data between and among people for collaboration and sharing of resources and knowledge, but such transferring can be used over any communications network suitable for transmitting digital signals. Herein communications network is defined as any electronic/optical link network suitable for sending and receiving digitized data.

A limitation of the process by which MIDI data is transferred over the Internet between people is the necessity for each musician to create MIDI data via a synthesizer and send the data serially to a computer system that stores that data in formats and locations that are not conducive to interactive music collaboration. Too much time is spent on the technical details of sending and receiving and too little on the collaborative generation of music. Typically, users would have a computer, a synthesizer/instrument with resident sequencer software that eventually stores MIDI data in the computer memory, Internet access hardware and software, and a browser or other such graphical user interface (GUI) that allows the user to view the Internet or World Wide Web (WWW). In a typical operation, the locally generated MIDI data is stored in local memory or it may be sent directly via the Internet. For the transference of MIDI data over the Internet, a file transfer protocol (FTP), e-mail, or the like may be used. To send data, as just described, the user must be familiar with each of the different hardware and software modules.

Synthesizer/sequencers are often difficult to use and/or manipulate. Moreover, each synthesizer/sequencer operates differently from each other. The MIDI data resides in proprietary formatted files, although the MIDI data itself is in universal protocol, on-board sound and timbre software editing is not standard. Since these differences must be specifically handled in an ad hoc manner such non-compatible items limit the present use of the Internet for music collaboration.

FIG. 1 shows a typical system for transferring music information, usually MIDI files. A synthesizer 2 is connected via a serial port to a computer system 4. There is a corresponding remote system with a synthesizer 2' connected to a computer system 4'. Each of the computer systems has Internet access often via a web browser that provides a graphical user interface (GUI). The computer systems have some kind of file transfer application 6 and 6', e.g. hypertext transfer protocol (HTTP). A musician at each of the two sites (remote from each other) may play and the synthesizers create MIDI data streams. The streams are input to the local computer systems which will store the MIDI data in various formats, which are not standardized, that can be transferred later over the Internet. Each musician can transfer the MIDI file to the other for subsequent playing. However the receiving musicians usually can play the music only after the received formats have been deciphered and/or modified for playing on the local synthesizer. The individuals must combine the locally stored files with the altered received files which are then combined for playing. Timing must be addressed in order in the above example, but the above scenario is not an interactive process conducive to real time interactive music collaboration. That is the musicians cannot play together as if in the same room.

It is an object of the present invention to provide a software tool embedded within a browser that allows sending, receiving, editing, and/or playing locally or remotely of multi-tracks of MIDI data.

It is yet another object of the present invention to provide means for real-time music collaboration over a communication network.

Another object of the present invention is to provide means for two or more remote musicians to play together as if they were playing physically at the same location.

It is another object of the present invention to provide means for musicians to access MIDI data files in remote locations for use in creating new MIDI data files.

It is yet another object of the present invention to provide means to transfer MIDI data packets embedded within transfer control protocol (TCP) packets.

It is still another object of the present invention to provide an embedded MIDI tool within a browser that handles all MIDI data transactions between the browser, the local and remote computer systems, and the local and remote synthesizers.

It is another object of the present invention to provide a single universal tool for handling MIDI data over communications networks.

SUMMARY OF THE INVENTION

The foregoing objects are met in a method and apparatus for sending and receiving MIDI data over a communication network connecting remote computer systems. The remote computer systems are synchronized to a single clock, the MIDI data is time stamped as it is created, and the network delay is measured and applied to the time stamped received MIDI data such that several streams of MIDI data can be placed in real-time order with respect to each other.

The MIDI data is wrapped for sending by adding a header or other such information to the MIDI data. That information identifies the MIDI data structure being sent over the communications network. Network transfer control protocols are created or are known for the networked communications systems, and transfer control protocol packets are formed incorporating the wrapped MIDI data. This approach allows the transfer control protocol packets to be transferred among the various remote computer systems while providing the advantage of bypassing the slow file transfer protocols (FTP's) that are now used to transfer music files or other such files.

Another advantage of the present invention is that musicians at the remote sites can play and hear the other musician, in real time as they play. However, in order to accomplish this effect, the network delays must be small enough to be insignificant to the playing. In a wide area network (WAN) sharing fast Ethernet, ISDN, T1 or T3 communications lines within a building or among adjacent buildings, the network delays may only be in the one to twenty millisecond range, which allows such real time playing of remote musicians. Of course, as the larger networks become faster this real time playing can be accomplished over larger geographical distances.

When any of the networked computer systems receive the transfer control packets incorporating the MIDI data, these systems will extract the MIDI data for storing or passing to a sequencer/synthesizer for playing.

The method of interactive, collaborative, synchronized, real time, playing of MIDI synthesizers and other such MIDI instruments across a communications network of remote computer systems includes: synchronizing all the networked computers to a single clock, measuring or calculating the time delay of the network, playing and thereby creating MIDI data, time stamping said MIDI data with the clock time, receiving MIDI data with the time stamp from at least one remote computer system, and applying the time delay to the received MIDI data. When the data is received form multiple remote computers, the MIDI data may be ordered in time. When playing, the ordered data is passed to a synthesizer or other such MIDI player wherein the synthesizer may play the MIDI data from all the remote sending sites in precise time synchronization.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
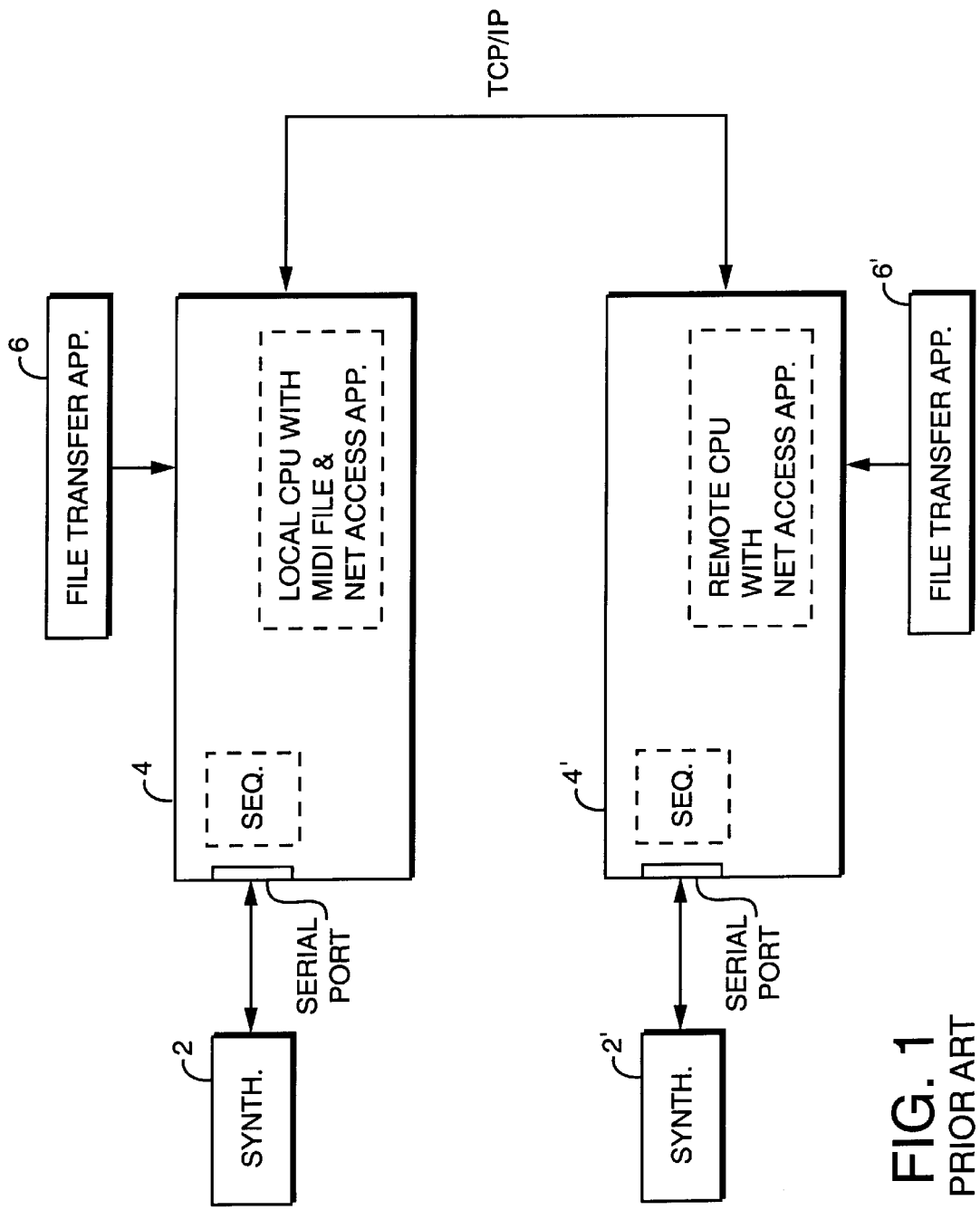
FIG. 1 is a functional block diagram of a prior art system.
Figure 2:
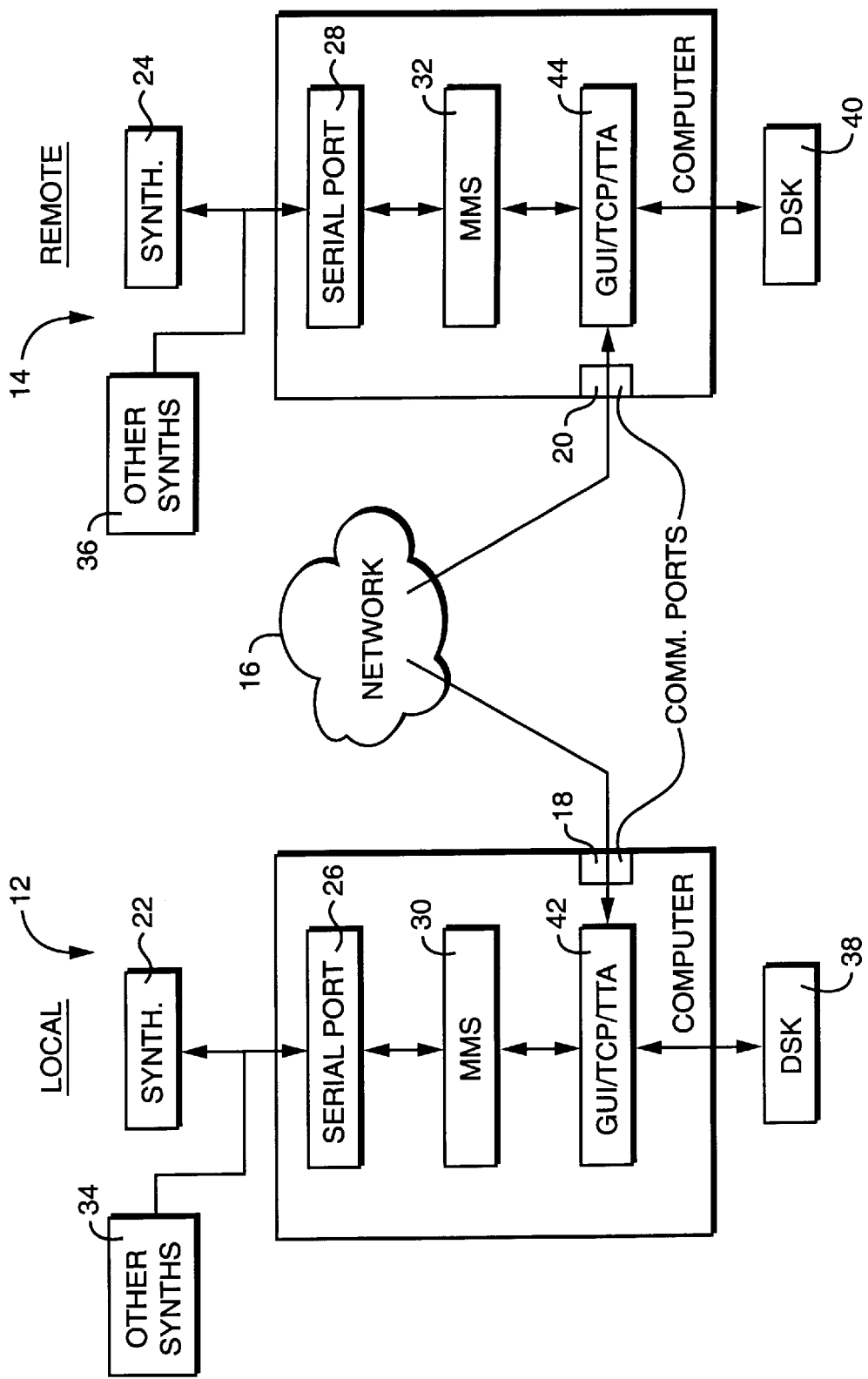
FIG. 2 is a functional block diagram of the data flow and path of a preferred embodiment.

FIG. 2 shows a preferred embodiment of the data flow in an architectural model of a preferred embodiment for a networked collaborative music environment. Two computer systems, one local 12 and one remote 14 are shown with duplicate blocks representing hardware and/or software. Each of these computer systems contains all the standard hardware and software typically found on personal computing systems. In addition to those standard items, there is a synthesizer/instrument 22 and 24 connected to serial ports 26 and 28, respectively, and a software module herein called MIDI management systems (MMS) 30 and 32, see addendum B. The actual transfer of information is accomplished using a graphical user interface (GUI), transfer control protocol (TCP), and a transfer application (TTA), inclusively, 42 and 44. The two systems communicate via a communications network 16, which might be the Internet, via communications port 18, 20 on each system. Other synthesizers 34 and 36 may be connected to each of the systems, and hard disks 38 and 40 may be provided for local storage. It is noted that full duplex connections to multiple remote sites via branching and other techniques are well known in the art.

Each of the synthesizers can be configured to accept MIDI data from any instrument and generate music therefrom. The data from the synthesizer is a stream of MIDI data bytes, and the MMS performs some low level bundling of the MIDI data bytes. Each of the synthesizers can be configured via the GUI to send MIDI data to the host computer system where the MMS may bundle the MIDI data for local storage and/or manipulation or pass that data to the GUI/TTA/TCP for transfer to a remote system via the Internet, or for local playing. Once all the remote sites are on-line and time synchronized to each other, the local user may generate MIDI signals and transfer those MIDI data to the remote system substantially coincidentally with the generation of the MIDI data. The remote system will receive and process the MIDI packets into MIDI data that may be sent directly to the synthesizer and/or stored. The operation of the standard parts of the computer systems and the resident software is well known in the art and only will be inferentially further discussed herein.

Figure 3:
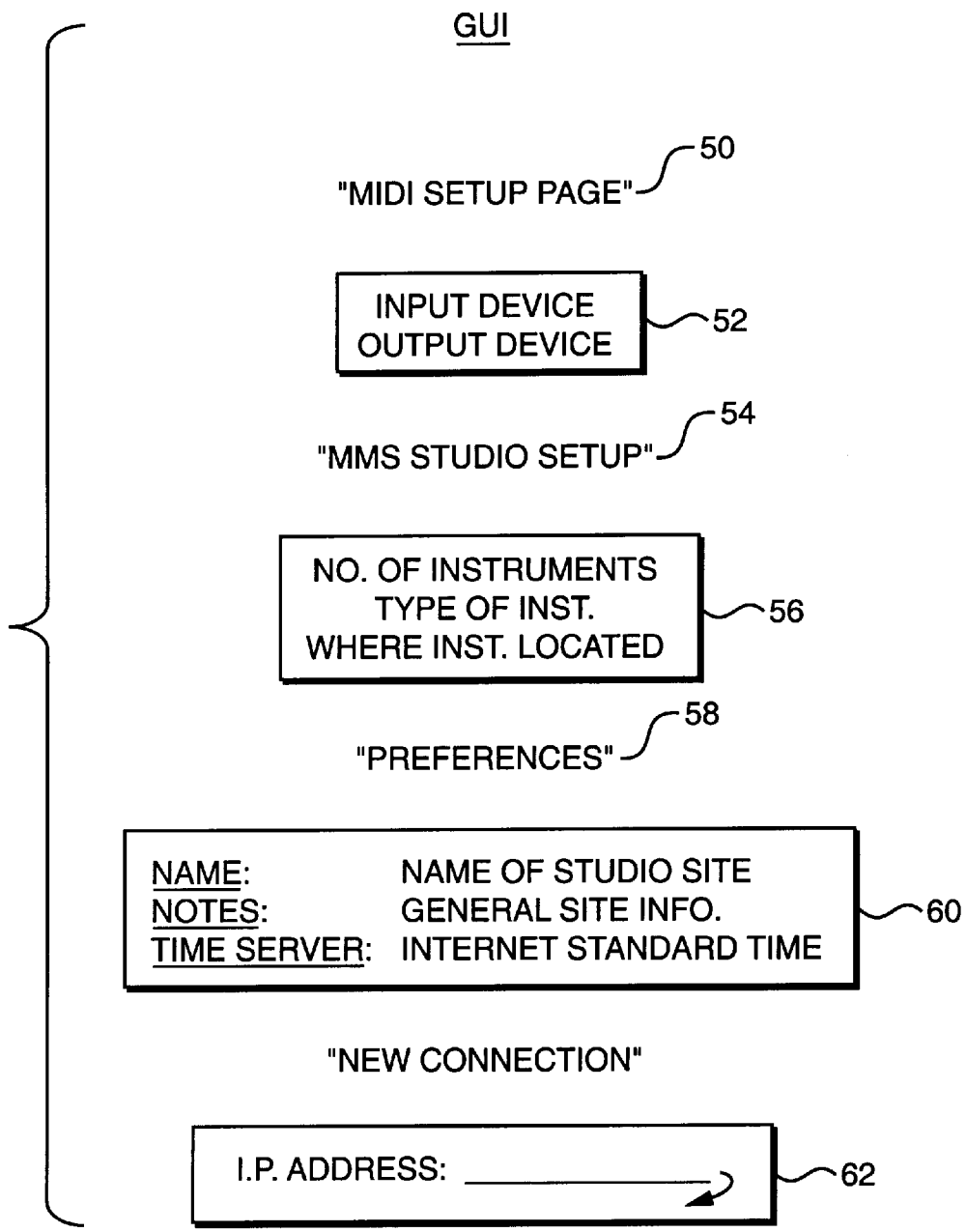
FIG. 3 is an outline of information within a graphical user interface used in a preferred embodiment.

FIG. 3 shows the information, organization and operation provided on a web page by the blocks of a GUI in order to configure the synthesizer and format and send the MIDI data in a preferred embodiment of the invention. The GUI provides web pages that organize and provide a means for setting up the collaborative environment for musicians not located together. The GUI provides a MIDI set up page 50 where the user may select which instrument will be connected to which synthesizer 52. The next page, or possibly part of the first page, is called, in this preferred embodiment the MMS Studio Setup 54 page. This page allows the user to enter the number and type of instruments 56 which will be connected to the system during the session, and the addressable location of each instrument 56 on the local computer system. The next page is called the Preferences page 58. Here the user enters the local site name, any general site information that may be useful to others at the remote sites, and the time server information 60. The last piece of information is the IP address of the site or sites to which the locally generated MIDI data is to be sent 62. Once the Internet connection is made the local system is ready to receive, process, and transmit MIDI packets of data.

Still referring to FIG. 3, the following functions are provided by the GUI: establishing TCP/IP connections between all the remote collaboration sites; exchanging the necessary information needed for transferring packets; establishing a network clock standard for synchronization (NTP); enabling control messaging among the sites, e.g. quit, acknowledge, mute, and voice control parameters; wrapping the MIDI data for transmitting via transfer control packets (TCP); and acting as the graphical user interface allowing the user to display and control the collaboration environment. In practice, in a preferred embodiment of the present invention the local user may want to send MIDI data to the remote sites. The MIDI data bundles as processed by the MMS are not, as noted above, sufficient for sending over the Internet. Additional information is prepared and a header is attached to the MIDI bundles. The TTA program adds a layer of information—the header, which wraps the MIDI packet module. When wrapped, the MIDI packet is sent with or as a TCP/IP packets without the need to use the cumbersome file transfer programs as discussed above.

Figure 4:
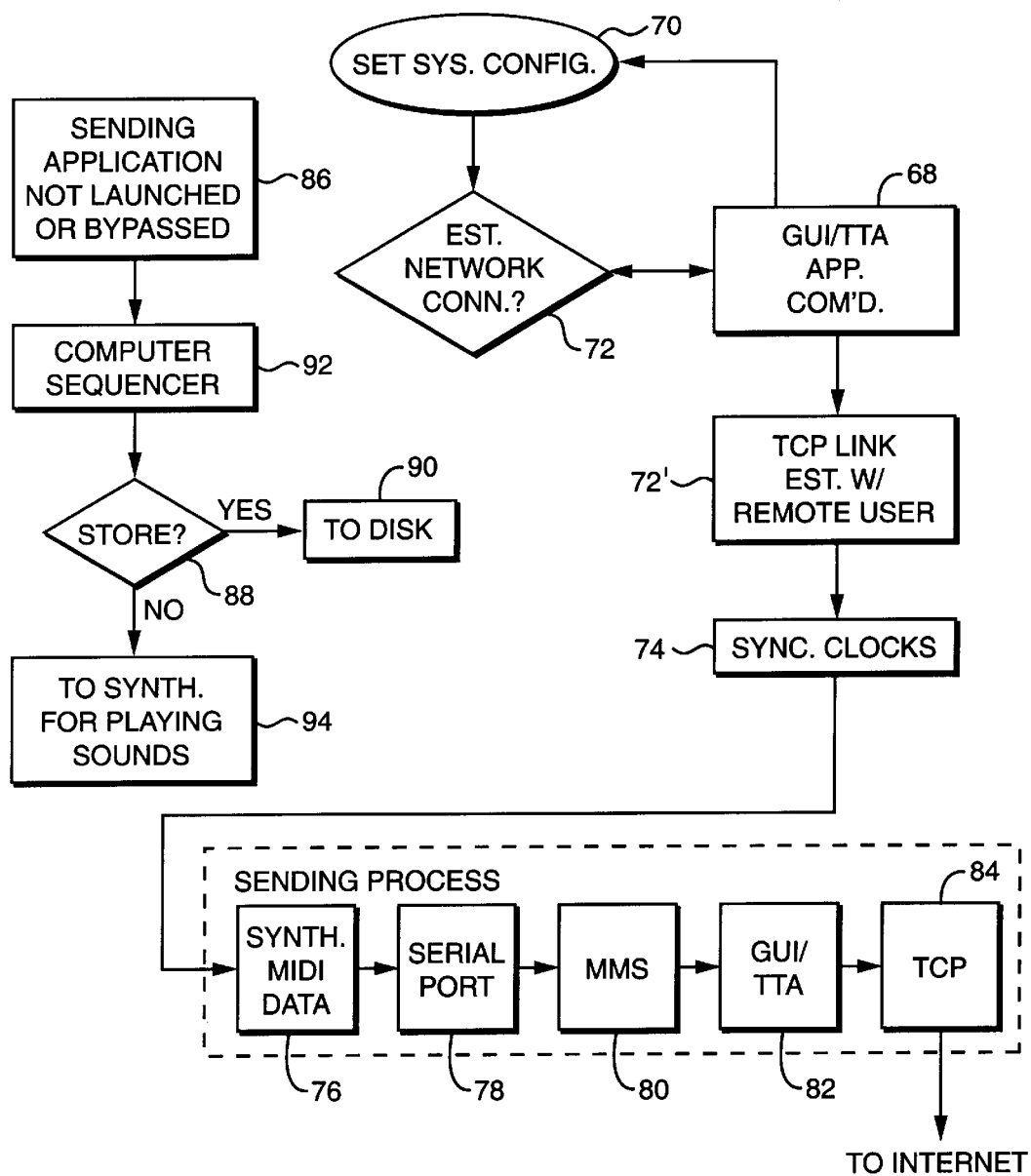
FIG. 4 is a functional block diagram/flow chart showing the creation of the wrapped MIDI data within transfer control protocol packets.

Referring to FIG. 4, in this preferred embodiment, the GUI/TTA software module 68 allows the user to configure the local system 70 and establish a full duplex communications link 72 and with the remote computer systems 72'. When the link is established the network of computers is synchronized 74 to a universal clock. In addition the computer network delay is measured or calculated by known methods, e.g. "pinging" as known in the art. Usually only one network time delay is measured/calculated and applied to the packets received, however, it may be advantageous, in some branching environments, to measure network delays from the various remote computer systems. In such an instance the data transmitted must identify the sending system. Identifying remote sending systems on a network is well known in the art. The remote computer systems trade information as described with reference to FIG. 3 above. That information includes the instrument type, application software versions, IP address and identity. When the users begin to play, data is generated by the synthesizer 76 and sent to the serial port 78. As described, the local and the remote systems are synchronized to a time clock. The MIDI data is received by the serial port 78 and, via the MMS 80 and the GUI/TCP/TTA 82 and 84, the MIDI data is packetized. As shown in FIG. 2, the MIDI data could be coming from more than one synthesizer. The packetized MIDI data is time stamped when generated by the local computer system with the absolute network time (NTP) to which the networked computers are synchronized and to which is applied the pre-calculated network delay time by the remote computer system when the data packets are received. In this manner all MIDI data being received at any network computer from any remote site can be time positioned in the proper relative time sequence with respect to all the received MIDI data. The packets of time stamped MIDI data are handled by the TCP module for sending with the packets under a transfer control protocol. MIDI packets are wrapped by the GUI/TCP/TTA module with header information as detailed, in a preferred embodiment, in Addendums A and B.

Addendum A defines the wrapped MIDI data protocol. The program listings in these Addendums are in Music and MIDI markup language which is an extension of the HTML frame and is similar to use of embedded applets. In this preferred embodiment the browser is enabled to submit forms to a MIDI device. Such forms allow the basic editing of the synthesizer's sound and program settings without being limited to the typical small LCD displays on the synthesizers themselves. This structure allows synthesizer specificity that facilitates this editing without the need for third party tools. Implementation includes a set of small compact drivers on the local machine that read and route MIDI serial data between browsers, local sequencers, tools and host sites. This preferred system can exist on virtually any operating system platform, operate with virtually any browser, and programs developed by others can be incorporated into this system under the applets plug-in technology. Other details of configuration, organization, wet-up details and elements are known to those skilled in the art and not discussed in detail herein other than to point out the wrapped MIDI data packet structure defined at the end of Addendum A. Addendum B shows the structure of the OMS packet which includes the time stamp and music measure time. Also included are attention flags that indicate special responses are needed, the length of the data—how many bytes are following until the end of the packet, reference numbers of the source code and the connection (who is sending and receiving), and MIDI data bytes.

In other preferred embodiments the wrapping of data for sending via TCP means allows other types of data to be sent and shared among many receivers in real or near real time depending on the network delay. For example, digitized voice, or other control signals, may be wrapped and sent instead of MIDI data.

Still referring to FIG. 4, the user may not want to send the MIDI data out over the Internet. If the user does not activate the GUI/TTA 86 module, the MIDI data generated may be stored 88 on a disk 90 configured as a sequencer 92 for later playback. Alternatively, or coincidentally, the MIDI data may be sent to the local synthesizer 94 for playing.

Figure 5:
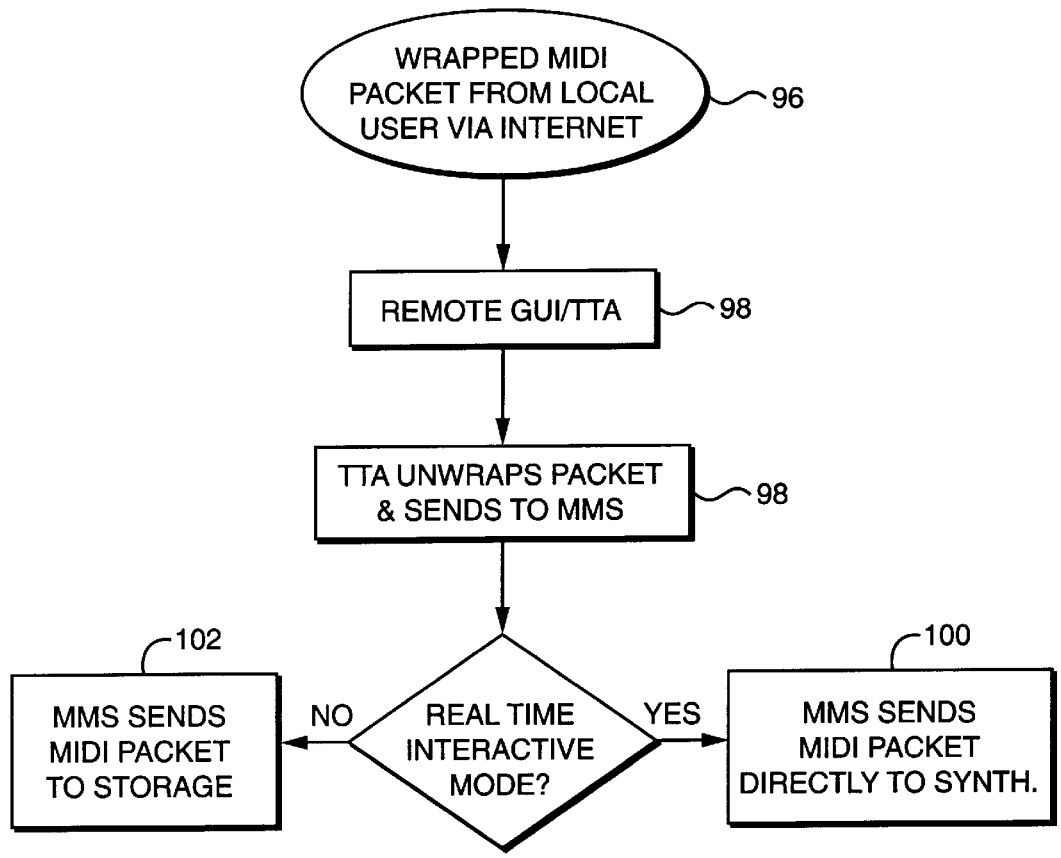
FIG. 5 is a functional block diagram/flow showing the receipt of the wrapped MIDI data

FIG. 5 shows the sequence of a remote site receiving the wrapped MIDI data packets 96. The GUI/TTA module 98 unwraps the packets extracting the MIDI data. The MIDI data is handled by the MMS module and sends that data, ready for playing, to the synthesizer 100 or to storage 102.

The present invention as shown in FIG. 5, allows the user to access remote sites via the Internet to extract archived music data, assuming the archived site incorporated the present invention, for real-time playing with the local user. Of course, the archived data can be stored for later editing and/or playing.

Other applications of the present invention include use: as a teaching aid between a student and a remote teacher; as an introductory device to relieve the keyboard fear that many beginning computer users feel; as an aid in composing by use and/or editing of the many available music databases; getting help on synthesizers and other equipment from the makers' web pages; sharing music files; and sharing multimedia files.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method of interactive, synchronized, collaborative real time, playing of MIDI data by MIDI synthesizers and MIDI instruments across an Internet network coupling remote computer systems comprising the steps of:

synchronizing all said remote computer systems to a single clock, determining a time delay of said Internet network, creating MIDI data at at least one of the remote computer systems, time stamping said MIDI data using said clock at the at least one remote computer system, receiving the MIDI data with said time stamp from the at least one remote computer system, and applying said time delay to the received MIDI data to synchronize the received MIDI data.

2. The method of claim 1 further comprising the step of:

time ordering said MIDI data in accordance with said time stamping from each remote computer system sending MIDI data.

3. The method of claim 2 further comprising the step of:

sending said time ordered MIDI data to at least one of a synthesizer and a MIDI instrument, the synthesizer and the MIDI instrument playing the MIDI data from all the remote computer systems in correct time synchronization.

4. Apparatus for interactive, collaborative, real time, playing of MIDI data by MIDI synthesizers and MIDI instruments across a an Internet network coupling remote computer systems, comprising:

means for synchronizing all said remote computer systems to a single clock, means for determining a time delay of said network, means for creating MIDI data at at least one of the remote computer systems, means for time stamping said MIDI data using said clock at the at least one remote computer system, means for receiving the MIDI data with said time stamp from the at least one remote computer system, and means for applying said time delay to the received MIDI data to synchronize the received MIDI data.

5. The apparatus defined in claim 4 further comprising:

means for time ordering said MIDI data in accordance with said time stamping from each remote computer system sending MIDI data.

6. The apparatus defined in claim 5 further comprising:

means for sending said time ordered MIDI data to at least one of a synthesizer and a MIDI instrument, the synthesizer and the MIDI instrument playing the MIDI data from all the remote computer systems in correct time synchronization.

7. A method of synchronizing MIDI data packets received from remote computers over a time synchronized internet network, comprising the steps, executed at a local computer, of:

determining a delay time in said network, receiving MIDI data packets from the remote computers, the MIDI data packets having time stamps indicating a time of creation of said MIDI data packets, and adding the delay time to the received MIDI data packets to synchronize the received MIDI data packets.

8. Apparatus for synchronizing MIDI data packets received from remote computers over a time synchronized an Internet network, comprising:

means for determining a delay time in said network, means for receiving MIDI data packets from the remote computers, the MIDI data packets having time stamps indicating a time of creation of said MIDI data packets, and means for applying the delay time to the received MIDI data packets to synchronize the received MIDI data packets.

9. A method of synchronizing MIDI data received at a computer system over an Internet network coupling the computer system to remote computer systems comprising the steps of:

synchronizing all said computer systems to a single clock, time stamping MIDI data using said clock as said MIDI data is created at one of the remote computer systems, determining a time delay of said Internet network, receiving the MIDI data having said time stamp at the computer system, and applying said time delay to synchronize the received MIDI data.

10. The method as defined in claim 1 further comprising the steps of:

wrapping said MIDI data having the time stamp with information identifying the MIDI data structure, creating transfer control packets, and incorporating said wrapped MIDI data into the transfer control packets for transmission on the network.

11. The method of claim 1 further comprising the steps of:

accessing the MIDI data, adding information to the MIDI data, said information identifying the MIDI data structure to be sent over said network, creating transfer control protocol packets, incorporating said MIDI data into the transfer control packets, and transmitting said transfer control packets to the network.

12. The method of claim 11 wherein the receiving step includes the substeps of:

receiving the transfer control packets from the network, identifying the MIDI data structure, extracting the MIDI data from the transfer control packets, and creating sound from said MIDI data.

13. The method of claim 11 wherein the receiving step includes the substeps of:

receiving the transfer control packets, extracting the MIDI data from the transfer control packets, and storing said MIDI data.

14. Apparatus for synchronizing MIDI data received at a computer system over an Internet network coupling the computer system to remote computer systems, comprising:

means for synchronizing all said computer systems to a single clock, means for time stamping MIDI data using said clock as said MIDI data is created at at least one of the remote computer systems, means for determining a time delay of said network, means for receiving the MIDI data having said time stamp at the computer system, and means for applying said time delay to said received MIDI data to synchronize the received MIDI data.

15. The apparatus as defined in claim 14 further comprising:

means for wrapping said MIDI data having the time stamp with information identifying the MIDI data structure, means for creating transfer control packets, and means for incorporating said wrapped MIDI data into the transfer control packets for transmission on the network.

16. A networked computer system for playing MIDI data from remote computer systems and from local MIDI apparatuses, the network computer system and the remote computer systems being coupled via a an Internet network, comprising:

means for receiving a network clock providing network time data, means for synchronizing said networked computer system to the network clock, means for incorporating the time data with the MIDI data from the local MIDI apparatuses, means for determining a delay time representing communication delays on said network, means for incorporating said delay time with said MIDI data from the remote computer systems, means for organizing said MIDI data from the remote computer systems and from the local MIDI apparatuses into a time ordered sequence using the time data and the delay time, and means for playing the organized MIDI data.

17. A memory, comprising:

local MIDI data created locally;

transfer control packets including:
- remote MIDI data received from the remote sites,
- time data including a time of creation of said local and remote MIDI data,
- network time delay data including a time delay of the remote MIDI data received from the remote sites, and information identifying a data structure of the local and remote MIDI data, such that the local and remote MIDI data can be extracted from the data structure for synchronized playing using the time data and the network time delay data.

* * * * *

UNITED STATES PATENT AND TRADEMARK OFFICE
CERTIFICATE OF CORRECTION

PATENT NO. : 6,175,872 B1  
DATED : January 16, 2001  
INVENTOR(S) : Eric K. Neumann, et al.

Page 1 of 1

It is certified that error appears in the above-identified patent and that said Letters Patent is hereby corrected as shown below:

On title page, item 54 Title replace 'SYNCRONIZING" with --SYNCHRONIZING--.

Col. 7, line 55 delete --an--before --Internet--.

Col. 8, line 18 add --header--between --adding-- and --information--.

Signed and Sealed this

Fifth Day of June, 2001

*Attest:*

NICHOLAS P. GODICI

*Attesting Officer*  
*Commissioner of Patents and Trademarks*